US008295601B2

(12) United States Patent
Bremer et al.

(10) Patent No.: US 8,295,601 B2
(45) Date of Patent: Oct. 23, 2012

(54) INDICIA READING TERMINAL HAVING MULTIPLE EXPOSURE PERIODS AND METHODS FOR SAME

(75) Inventors: Edward C. Bremer, Victor, NY (US); William H. Havens, Syracuse, NY (US); Chen Feng, Snohomish, WA (US); Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 496 days.

(21) Appl. No.: 12/540,214

(22) Filed: Aug. 12, 2009

(65) Prior Publication Data

US 2011/0038563 A1 Feb. 17, 2011

(51) Int. Cl.
*G06K 9/00* (2006.01)
(52) U.S. Cl. ........................................................ 382/181
(58) Field of Classification Search .................. 382/181, 382/313
See application file for complete search history.

(56) References Cited

U.S. PATENT DOCUMENTS

| | | | |
|---|---|---|---|
| 5,010,241 A | 4/1991 | Butterworth | |
| 5,019,699 A | 5/1991 | Koenck | |
| 5,378,883 A | 1/1995 | Batterman et al. | |
| 5,504,367 A | 4/1996 | Arackellian et al. | |
| 5,521,366 A | 5/1996 | Wang et al. | |
| 5,572,006 A | 11/1996 | Wang et al. | |
| 5,576,529 A | 11/1996 | Koenck et al. | |
| 5,579,487 A | 11/1996 | Meyerson et al. | |
| 5,591,955 A | 1/1997 | Laser | |
| 5,646,390 A * | 7/1997 | Wang et al. | 235/454 |
| 5,691,773 A | 11/1997 | Wang et al. | |
| 5,702,059 A | 12/1997 | Chu et al. | |
| 5,703,349 A | 12/1997 | Meyerson et al. | |
| 5,714,745 A | 2/1998 | Ju et al. | |
| 5,717,195 A | 2/1998 | Feng et al. | |
| 5,739,518 A | 4/1998 | Wang | |
| 5,756,981 A | 5/1998 | Roustaei et al. | |
| 5,773,810 A | 6/1998 | Hussey et al. | |

(Continued)

FOREIGN PATENT DOCUMENTS

EP 2364026 A2 9/2011

(Continued)

OTHER PUBLICATIONS

U.S. Appl. No. 12/242,244, filed Sep. 30, 2008 entitled, Method and Apparatus for Operating Indicia Reading Terminal Including Parameter Determination.

(Continued)

*Primary Examiner* — Vikkram Bali
(74) *Attorney, Agent, or Firm* — Heslin Rothenberg Farley & Mesiti P.C.

(57) ABSTRACT

There is described an image reading terminal having an image sensor array including a plurality of pixels, a first optical assembly for focusing imaging light rays onto a first set of pixels of an image sensor array and a second optical assembly for focusing imaging light rays onto a second set of pixels of the image sensor array. The first set of pixels and the second set of pixels of the image sensor array can have different exposure settings in a single exposure period for the image sensor array. In one embodiment, the indicia reading terminal can be adapted to process image data corresponding to pixels of the image sensor array for attempting to decode a decodable indicia.

20 Claims, 13 Drawing Sheets

U.S. PATENT DOCUMENTS

| | | | |
|---|---|---|---|
| 5,786,582 | A | 7/1998 | Roustaei et al. |
| 5,811,828 | A | 9/1998 | Laser |
| 5,814,803 | A | 9/1998 | Olmstead et al. |
| 5,814,827 | A | 9/1998 | Katz |
| 5,821,518 | A | 10/1998 | Sussmeier et al. |
| 5,831,254 | A | 11/1998 | Karpen et al. |
| 5,834,754 | A | 11/1998 | Feng et al. |
| 5,837,987 | A | 11/1998 | Koenck et al. |
| 5,872,354 | A | 2/1999 | Hanson |
| 5,877,487 | A | 3/1999 | Tani et al. |
| 5,920,061 | A | 7/1999 | Feng |
| 5,949,052 | A | 9/1999 | Longacre, Jr. et al. |
| 5,986,297 | A | 11/1999 | Guidash et al. |
| 6,053,408 | A * | 4/2000 | Stoner ............... 235/462.22 |
| 6,062,475 | A | 5/2000 | Feng |
| 6,123,263 | A | 9/2000 | Feng |
| 6,152,368 | A | 11/2000 | Olmstead et al. |
| 6,155,488 | A | 12/2000 | Olmstead et al. |
| 6,157,027 | A | 12/2000 | Watanabe et al. |
| 6,276,605 | B1 | 8/2001 | Olmstead et al. |
| 6,311,895 | B1 | 11/2001 | Olmstead et al. |
| 6,318,635 | B1 | 11/2001 | Stoner |
| 6,318,637 | B1 | 11/2001 | Stoner |
| 6,347,163 | B2 | 2/2002 | Roustaei |
| 6,431,452 | B2 | 8/2002 | Feng |
| 6,598,787 | B1 | 7/2003 | Grinsteiner |
| 6,637,658 | B2 | 10/2003 | Barber et al. |
| 6,714,239 | B2 | 3/2004 | Guidash |
| 6,722,569 | B2 | 4/2004 | Ehrhart et al. |
| 6,814,290 | B2 | 11/2004 | Longacre |
| 6,889,904 | B2 | 5/2005 | Bianculli et al. |
| 6,976,631 | B2 | 12/2005 | Kashi et al. |
| 7,044,378 | B2 | 5/2006 | Patel et al. |
| 7,083,098 | B2 | 8/2006 | Joseph et al. |
| 7,148,923 | B2 | 12/2006 | Harper et al. |
| 7,219,843 | B2 | 5/2007 | Havens et al. |
| 7,234,641 | B2 | 6/2007 | Olmstead |
| 7,268,924 | B2 | 9/2007 | Hussey et al. |
| 7,270,273 | B2 | 9/2007 | Barber et al. |
| 7,270,274 | B2 | 9/2007 | Hennick et al. |
| 7,568,628 | B2 | 8/2009 | Wang et al. |
| 7,611,060 | B2 | 11/2009 | Wang et al. |
| 7,699,227 | B2 | 4/2010 | Wang et al. |
| 7,740,176 | B2 | 6/2010 | Wang et al. |
| 7,770,799 | B2 | 8/2010 | Wang |
| 7,780,089 | B2 | 8/2010 | Wang |
| 7,784,696 | B2 | 8/2010 | Wang |
| 7,909,257 | B2 | 3/2011 | Wang et al. |
| 7,918,397 | B2 | 4/2011 | Hussey |
| 7,984,855 | B2 | 7/2011 | Wang |
| 7,992,784 | B2 | 8/2011 | Barten |
| 8,002,188 | B2 | 8/2011 | Wang |
| 8,025,232 | B2 | 9/2011 | Wang |
| 8,146,820 | B2 | 4/2012 | Wang et al. |
| 2002/0125317 | A1 | 9/2002 | Hussey et al. |
| 2002/0171745 | A1 | 11/2002 | Ehrhart |
| 2002/0179713 | A1 | 12/2002 | Pettinelli et al. |
| 2003/0031851 | A1 | 2/2003 | Bourdelais et al. |
| 2003/0062413 | A1 | 4/2003 | Gardiner et al. |
| 2003/0197063 | A1 | 10/2003 | Longacre, Jr. |
| 2003/0201328 | A1 | 10/2003 | Jam et al. |
| 2003/0222147 | A1 | 12/2003 | Havens et al. |
| 2003/0226895 | A1 | 12/2003 | Havens et al. |
| 2004/0020990 | A1 | 2/2004 | Havens et al. |
| 2004/0035933 | A1 | 2/2004 | Havens et al. |
| 2004/0129783 | A1 | 7/2004 | Patel |
| 2004/0155110 | A1 | 8/2004 | Ehrhart et al. |
| 2005/0103864 | A1 | 5/2005 | Zhu et al. |
| 2005/0145698 | A1 | 7/2005 | Havens et al. |
| 2006/0011724 | A1 | 1/2006 | Joseph et al. |
| 2006/0113386 | A1 | 6/2006 | Olmstead |
| 2006/0163355 | A1 | 7/2006 | Olmstead et al. |
| 2006/0180670 | A1 | 8/2006 | Acosta et al. |
| 2006/0202036 | A1 | 9/2006 | Wang et al. |
| 2006/0202038 | A1 | 9/2006 | Wang et al. |
| 2006/0274171 | A1 | 12/2006 | Wang |
| 2006/0283952 | A1 | 12/2006 | Wang |
| 2007/0102520 | A1 | 5/2007 | Carlson et al. |
| 2007/0108284 | A1 | 5/2007 | Pankow et al. |
| 2007/0158428 | A1 | 7/2007 | Havens et al. |
| 2007/0164115 | A1 | 7/2007 | Joseph et al. |
| 2007/0241195 | A1 | 10/2007 | Hussey et al. |
| 2007/0267490 | A1 | 11/2007 | Jerabeck et al. |
| 2007/0267501 | A1 | 11/2007 | Jovanovski et al. |
| 2008/0041954 | A1 | 2/2008 | Gannon et al. |
| 2009/0026267 | A1 * | 1/2009 | Wang et al. ............... 235/440 |
| 2009/0072038 | A1 | 3/2009 | Li et al. |
| 2010/0044440 | A1 | 2/2010 | Wang et al. |
| 2010/0090007 | A1 | 4/2010 | Wang et al. |
| 2010/0289915 | A1 | 11/2010 | Wang |
| 2010/0315536 | A1 | 12/2010 | Wang |
| 2011/0080500 | A1 | 4/2011 | Wang et al. |
| 2011/0163166 | A1 | 7/2011 | Wang et al. |
| 2011/0303750 | A1 | 12/2011 | Wang et al. |
| 2012/0018517 | A1 | 1/2012 | Wang et al. |

FOREIGN PATENT DOCUMENTS

| | | |
|---|---|---|
| EP | P2410464 A1 | 1/2012 |
| WO | WO-9613799 A2 | 5/1996 |

OTHER PUBLICATIONS

U.S. Appl. No. 12/326,443, filed Dec. 2, 2008 entitled Indicia Reading Terminal Having Plurality of Optical Assemblies.

U.S. Appl. No. 12/335,777, filed Dec. 16, 2008 entitled Indicia Reading Terminal Including Frame Processing.

European Patent Office, European Patent Application No. 10172331.0, Communication pursuant to Article 94(3) EPC, dated Sep. 2, 2011 (4 pages).

European Patent Office, Communication pursuant to Article 94(3) EPC, dated Jan. 7, 2011 (5 pages).

European Patent Office, Partial European Search Report, dated Dec. 20, 2010 (4 pages).

European Patent Office, Invitation pursuant to Rule 62a(1) EPC, dated Sep. 6, 2010 (3 pages).

US 8,047,439, 10/2011, Havens et al. (withdrawn).

* cited by examiner

INDICIA READING TERMINAL HAVING MULTIPLE EXPOSURE PERIODS AND METHODS FOR SAME

FIELD OF THE INVENTION

The invention relates to imaging terminals in general and in particular to imaging terminals having multiple optical assemblies.

BACKGROUND OF THE PRIOR ART

Indicia reading terminals are available in multiple varieties. The well known gun style reader is available in a form devoid of a keyboard and display. Enhanced functioning indicia reading terminals having keyboards displays and advanced networking communication capabilities are also available.

Users of indicia reading terminals whatever the variety have long desired an increase in working range (a measure of a terminal's capacity to decode decodable indicia at a wide range of terminal to target distances). Various proposals have been made for increasing a terminal's working range. Approaches in the related art have been based on optical design, analog signal processing, digital signal processing and on combinations of the above. However, designs for increased working range have often resulted in high cost, significantly increased complexity in manufacturability, reduced reliability and reduced durability. There remains a need for an increased working range indicia reading terminal. There further remains a need for an increased working speed indicia reading terminal.

SUMMARY OF THE INVENTION

There is described an indicia reading terminal having an image sensor array including a plurality of pixels, a first optical assembly for focusing imaging light rays onto a first set of pixels of an image sensor array and a second optical assembly for focusing imaging light rays onto a second set of pixels of the image sensor array. The indicia reading terminal can have independent exposure and/or gain control for the first set of pixels and the second set of pixels. The indicia reading terminal can be adapted to process image data corresponding to pixels of the image sensor array for attempting to decode a decodable indicia.

BRIEF DESCRIPTION OF THE DRAWINGS

Features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF EMBODIMENTS

Figure 1:
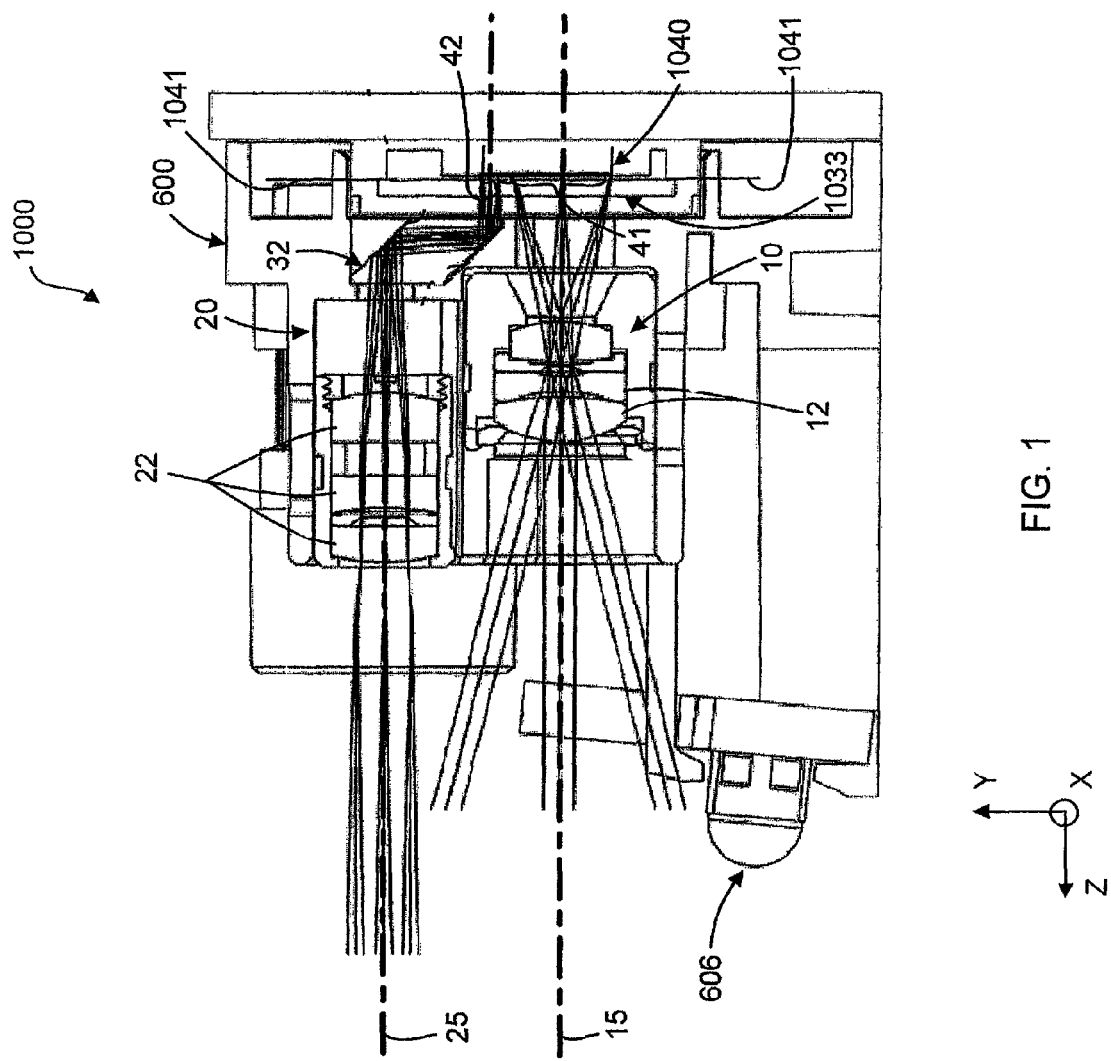
FIG. 1 is a side cross sectional view of an indicia reading terminal imaging module in an illustrative embodiment having a first optical assembly and a second optical assembly.

A cross sectional side view of an indicia reading terminal 1000 in one embodiment is shown in FIG. 1. Terminal 1000 can include an imaging module 600 having multiple optical assemblies; for example, a first optical assembly 10 and a second optical assembly 20. Terminal 1000 can also have an image sensor array 1033 including a plurality of pixels and can be configured so that first optical assembly 10 focuses imaging light rays onto a first set of pixels 41 of an image sensor array 1033 and a second optical assembly 20 focuses imaging light rays onto a second set of pixels 42 of the image sensor array 1033. Indicia reading terminal 1000 can be adapted to process image data corresponding to pixels of the image sensor array 1033 for attempting to decode a decodable indicia.

In the exemplary embodiment the first and second optical assemblies can have different characteristics. In one aspect the first and second optical assemblies can have different characteristics in terms of various characteristics such as optical axis, focal lengths, or best focus distances, etc. The first optical assembly 10 can provide selected or optimal focusing at a first terminal to target distance and the second optical assembly 20 can provide selected or optimal focusing at a second different terminal to target distance.

A hardware platform suitable for supporting operational aspects of an indicia reading terminal described herein is described with reference to FIG. 2. Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 to convert image information in the form of analog signals read out of image sensor array 1033 into image information in the form of digital signals. Image sensor 1032 can also have an associated timing and control circuit 1038 for use in controlling e.g., exposure periods of image sensor 1032, and gain applied to the amplifier circuitry 1036. The noted circuit components 1032, 1036, 1037, and 1038 can be packaged into an image sensor integrated circuit 1040. Image sensor integrated circuit 1040 can also include a filter element defining color sensitive pixel elements dispersed throughout an array of monochrome pixels. In one example, image sensor integrated circuit 1040 can be provided by a CMOS image sensor integrated circuit. In another example, image sensor integrated circuit 1040 can incorporate a Bayer pattern filter. In one example, image sensor 1040 can be provided by monochrome MT9V022 image sensor integrated circuit available from Micron Technology, Inc., which also can be modified to include color filters. In one embodiment, CPU 1060 prior to subjecting a frame to further processing can interpolate pixel values intermediate of color pixels such as green pixel values for development of a monochrome frame of image data.

Image sensor array 1033 can include first set of pixels 41 onto which light transmitted by first optical assembly 10 is incident and second set of pixels 42 onto which light transmitted by second optical assembly 20 is incident. First set of pixels 41 can comprise the pixels of more than 50% of the rows of pixels of array 1033, and second set of pixels 42 can comprise the pixels of less than 50% of the rows of pixels of array 1033. In another embodiment, first set of pixels 41 can comprise about 60% of the rows of pixels of array 1033, and second set of pixels 42 can comprise about 40% of the rows of pixels of array 1033. In another embodiment, first set of pixels 41 can comprise about 75% of the rows of pixels of array 1033, and second set of pixels 42 can comprise about 25% of the rows of pixels of array 1033. In another embodiment, first set of pixels 41 can comprise about 99% of the rows of pixels of array 1033, and second set of pixels 42 can comprise about 1% of the rows of pixels of array 1033. Further, the percentages of the first set of pixels 41 and the second set of pixels 42 can be reversed. An exemplary embodiment of image sensor array 1033 that is divided into a first set of pixels 41 and a second set of pixels 42 can be an active array matrix (e.g., 838 H by 640 V, 752 H by 480 V, etc.) that can be placed within housing 11 (e.g., 5 mm×4 mm).

In the course of operation of terminal 1000 image signals can be read out of image sensor 1032, amplified by amplifier 1036, converted by analog to digital converter 1037 and stored into a system memory such as RAM 1080. A set of image data corresponding to pixels of image sensor array 1033 can be regarded as a frame of image data. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 that can be adapted to address and read out image data stored in memory 1080 and subject such image data to various image processing algorithms. Terminal 1000 can include a direct memory access unit (DMA) 1070 for routing image information read out from image sensor 1032 that has been subject to amplification and conversion to RAM 1080. In another embodiment, terminal 1000 can employ a system bus 1500 providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and memory 1085 (e.g., RAM 1080) are within the scope and the spirit of the invention.

Terminal 1000 can be operative so that terminal 1000 can capture a succession of frames by storage of the frames in memory 1080 where the frames are addressable for processing by CPU 1060. Terminal 1000 can be operative so that the capture and/or processing of the succession of frames is responsive to activation of a trigger signal. Terminal 1000 can be operative so that such trigger signal can be activated when an operator actuates a trigger of terminal 1000.

Figure 2:
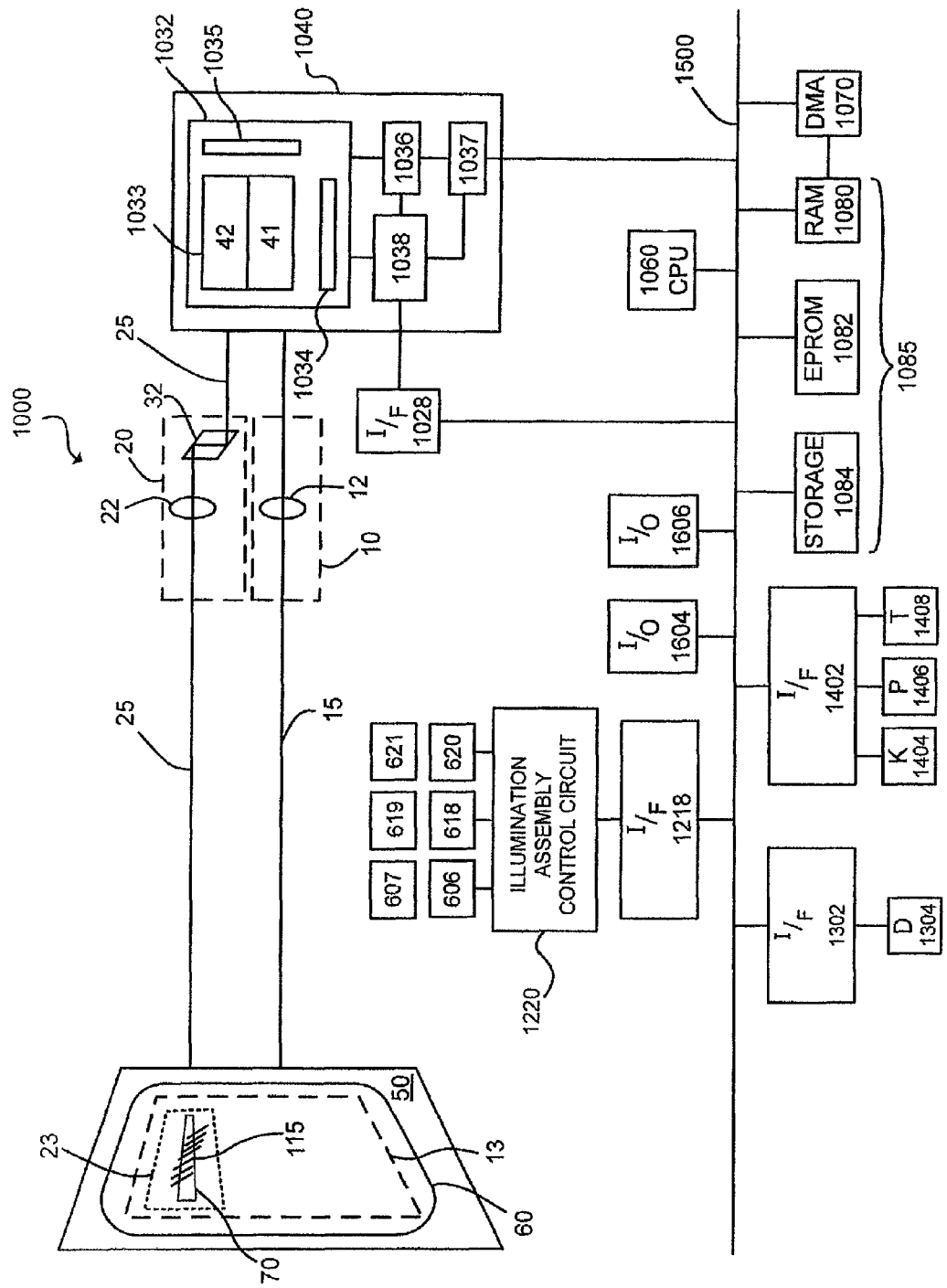
FIG. 2 is a block diagram illustrating exemplary hardware components which can be incorporated in an indicia reading terminal as described herein.

As illustrated in FIG. 2 and as described further herein, terminal 1000 can include a first optical assembly 10 and a second optical assembly 20. The first optical assembly 10 can have an imaging lens 12 and a center optical axis 15, and the second optical assembly 20 can include an imaging lens 22, center optical axis 25 and a prism 32 for folding the center optical axis 25 of the second optical assembly 20. First optical assembly 10 together with image sensor array 1033 can define an associated first field of view 13 on a target 50 and second optical assembly 20 can define an associated second field of view 23 (e.g., on a target substrate 50).

Terminal 1000 can also include an illumination pattern light source bank 606 for use in projecting an illumination pattern 60 on target 50 and an aiming pattern light source bank 618 for use in projecting pattern 70 on target 50. Each of bank 606 and bank 618 can include one or more light sources. Terminal 1000 can include shaping optics 607, 619 for shaping light from light source banks 606 and 618, respectively, so that light from banks 606 and 618 can be projected into the aforementioned pattern 60 and pattern 70 respectively. In use, terminal 1000 can be oriented by an operator with respect to a target 50 bearing decodable indicia 115 in such manner that aiming pattern 70 is projected on a decodable indicia 115, that can be disposed on a target substrate 50. In the example of FIG. 2, decodable indicia 115 is provided by a 1D bar code symbol. Decodable indicia could also be provided by items such as 2D bar code symbols or optical character recognition (OCR) characters. Each of illumination pattern light source bank 606 and aiming pattern light source bank 618 can include one or more light sources. Illumination assembly control circuit 1220 can send signals to illumination pattern light source bank 606 e.g., for changing a level of illumination output by illumination pattern light source bank 606. The combination of light source bank 606 and shaping optics 607 for shaping light from bank 606 for projecting pattern 60 can be regarded as an illumination pattern generator. The combination of illumination light source bank 618 and shaping optics 619 for shaping light from bank 618 for projecting pattern 70 can be regarded as an aiming pattern generator. In addition to or as an alternative to having an aiming pattern generator provided by the combination of light source bank 618 and shaping optics 619, terminal 1000 can have an aiming pattern generator provided by the combination of light source bank 620 and shaping optics 621. Light source bank 620 can be a laser diode assembly.

Terminal 1000 can also include a number of peripheral devices such as display 1304 for displaying such information as image frames captured with use of terminal 1000, keyboard 1404, pointing device 1406 for control of a user interface cursor displayed on display 1304, and trigger 1408 which may be used to make active a trigger signal for activating frame readout and/or certain decoding processes. Terminal 1000 can be adapted so that activation of trigger 1408 activates a trigger signal and initiates a decode attempt. Terminal 1000 can be operative so that subsequent to activation of a trigger signal or for a time that the trigger signal remains active, terminal 1000 captures into a memory e.g., memory 1080, a succession of frames of image data and subjects one or more of the captured frames to a decode attempt. Terminal 1000 can be adapted so that memory 1080 stores one or more frames of image data therein at a time. Memory 1080 can be capable of storing a frame or a succession of frames therein. When a frame or a succession of frames is stored in memory 1080, the frame can be addressed by CPU 1060 for subjecting the frame to decoding processing for attempting to decode the frame for decodable indicia.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1218 for coupling illumination assembly control circuit 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, terminal 1000 can include one or more I/O interfaces 1604, 1606 for providing communication with external devices (e.g., a cash register server, a store server, an inventory facility server, a peer terminal 1000, a local area network base station, a cellular base station). I/O interfaces 1604, 1606 can be interfaces of any combination of known computer interfaces, e.g., Ethernet (IEEE 802.3), USB, IEEE 802.11, Bluetooth, CDMA, GSM.

Terminal 1000 can capture frames of image data at a rate known as a frame rate. A typical frame rate is 60 frames per second (FPS), which translates to a frame time (frame period) of 16.6 ms. Another typical frame rate is 30 frames per second (FPS), which translates to a frame time (frame period) of 33.3 ms per frame.

CPU 1060, appropriately programmed can carry out a decoding process for attempting to decode a frame of image data. Terminal 1000 can be operative so that CPU 1060 for attempting to decode a frame of image data can address image data of a frame stored in RAM 1080 and can process such image data. For attempting to decode, CPU 1060 can sample image data of a captured frame of image data along a sampling path, e.g., along a first sampling path through a first set of pixel positions corresponding to a first set of pixels 41 and along a second sampling path through a second set of pixel positions corresponding to a second set of pixels 42. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt can comprise the steps of locating a finder pattern using a feature detection algorithm, locating data lines intersecting the finder pattern according to a predetermined relationship with the finder pattern, determining a pattern of dark and light cells along the data lines, and converting each light pattern into a character or character string via table lookup.

It has been noted that terminal 1000 can be operative so that subsequent to activation of a trigger signal, terminal 1000 can capture a succession of frames and subject one or more of the captured frames to a decode attempt. A succession of frames of image data that can be captured and subject to the described decoding processing can be full frames (including pixel values corresponding to more than about 80% of pixels of image sensor 1032). A succession of frames of image data that can be captured and subject to the described processing (e.g., processing for attempting to decode) can also be "windowed frames" comprising pixel values corresponding to less than about 80%, and in some cases less than about 50%, and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Figure 3:
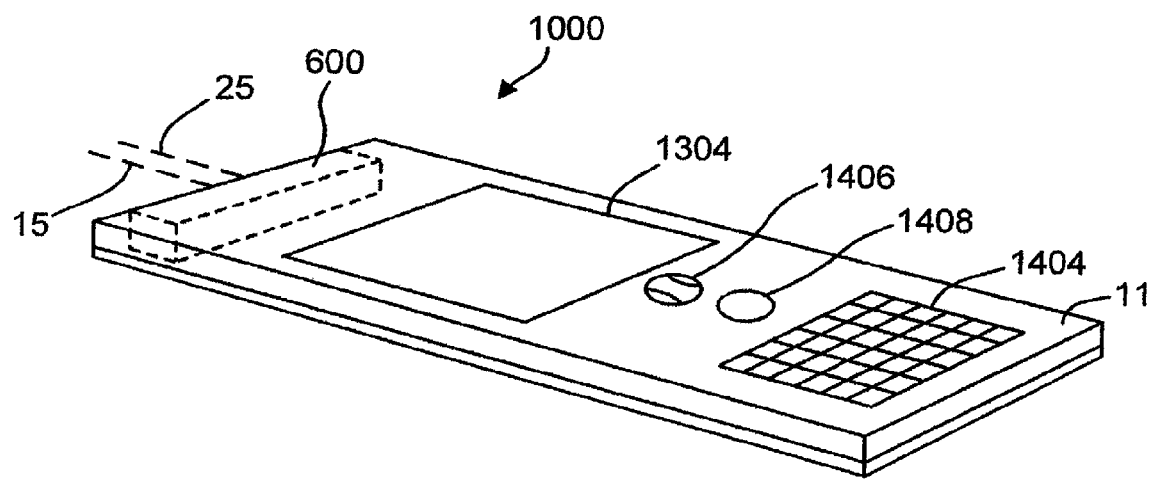
FIG. 3 is a perspective view of an embodiment of an indicia reading terminal including a hand held housing that encapsulates an image sensor.

FIG. 3 is a perspective view of an embodiment of an imaging terminal including a hand held housing 11, which can support various components as shown in the block diagram of FIG. 2.

Referring again to the diagram of FIG. 1, first optical assembly 10 can have optical characteristics differentiated from second optical assembly 20. Assembly 10 can transmit imaging light rays about center optical axis 15, which can be folded or unfolded along its length. Second optical assembly 20 can transmit imaging light rays about center optical axis 25, which can be folded or unfolded along its length.

In one embodiment, first optical assembly 10 and second optical assembly 20 can be adapted so that the respective best focus distances and focal lengths of imaging lens 12 and imaging lens 22 are fixed. For two optical assemblies at a given distance from a target, an optical assembly having a longer focal length will provide a narrower field of view. In one example, terminal 1000 can be configured so that second optical assembly 20 has a relatively longer focal length than first optical assembly 10.

As shown in FIG. 2, a first set of pixels 41 and a second set of pixels 42 can receive light respectively from separate lens systems to form two discrete images on a single image sensor 1032. The characteristics of each lens system can be different and in one embodiment, there can be a large difference in image brightness relative to the first set of pixels 41 and the second set of pixels 42. An image reading process will have a difficult and under selected conditions it will not be possible to obtain an acceptable image for the first set of pixels 41 and the second set of pixels 42 using the same exposure and/or gain setting for the image sensor 1032 as a whole. Embodiments according to the application can provide apparatus, systems, and methods for using the same that can separately (e.g., independently) control a gain settings and/or exposure settings for each of the first set of pixels 41 and the second set of pixels 42.

Figure 4:
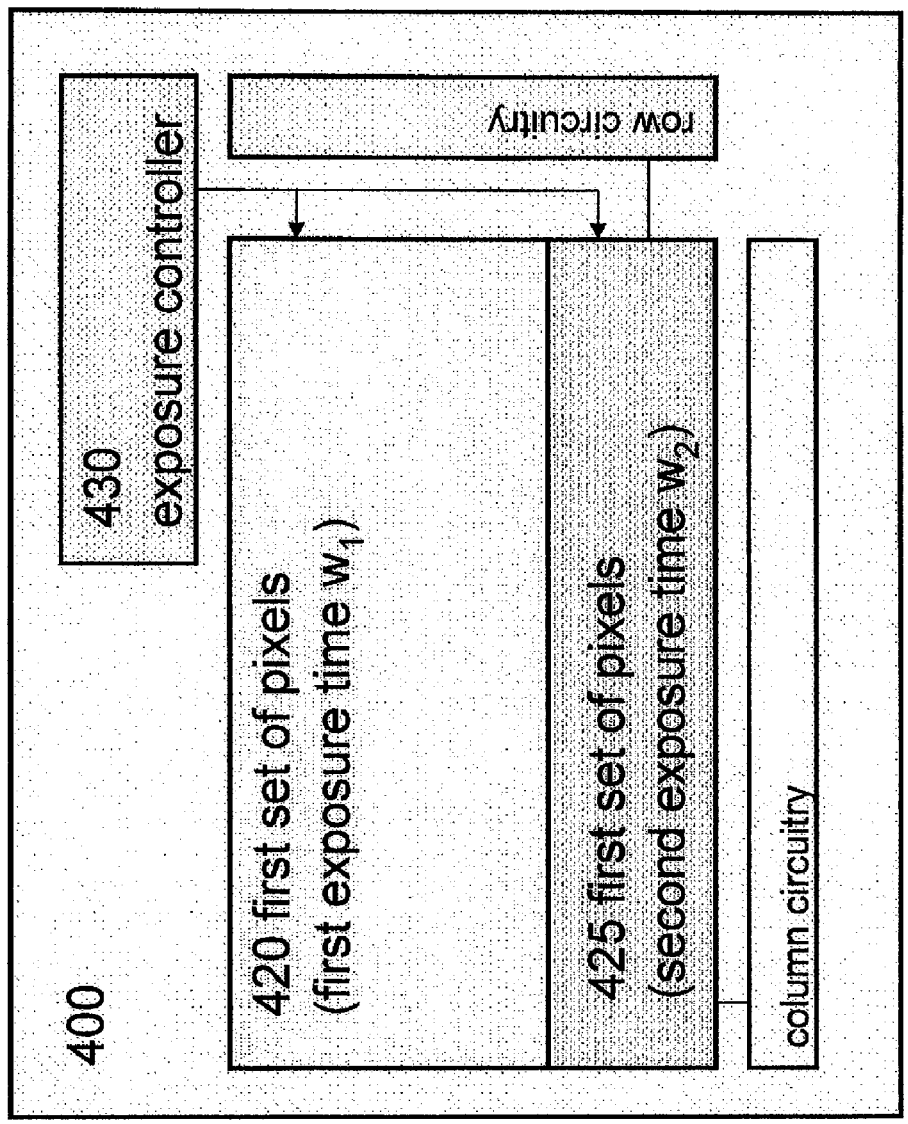
FIG. 4 is a block diagram illustrating an embodiment of an image sensor array having a first set of pixels and a second set of pixels.

An embodiment of an image sensor according to the application will now be described. As shown in FIG. 4, an image sensor 400 can include two defined regions 420 and 425 that can respectively receive imaging light from a dual lens system to form two images. For example, such a dual lens system can include the first and second optical assemblies 10, 20. In one embodiment, the image sensor 400 can be used as the image sensor 1032 described herein. In one embodiment, the regions 420 and 425 are contiguous and comprise all pixels in the array forming the image sensor 400. Thus, the two defined regions 420 and 425 can include the full image size of the image sensor 400. In one example, the regions 420, 425 simultaneously receive corresponding portions of light impinging the terminal 1000.

As shown in FIG. 4, an exposure controller can be used to independently control and/or separately set different control such as gain settings, exposure settings or frame time for the regions 420 and 425. The first region 420 can have a first exposure period $w_1$ that is greater than, less than or different from a second exposure period $w_2$ for the second region 425. Preferably, all pixels in region 420 will have the same exposure period $w_1$ and all pixels in region 425 will have the same exposure period $w_2$. In one embodiment, the exposure controller 430 can comprise a timing signal supplied to each individual pixel to selectively terminate each of the first exposure period $w_1$ and the second exposure period $w_2$ in an exposure period of the image sensor 400. Alternatively, the exposure controller 430 can provide signals to each of the individual pixels to control an interval of the first exposure period $w_1$ and the second exposure period $w_2$ in an exposure period of the image sensor 400. For example, the exposure controller 430 can be implemented separated by the controller 1060, or the control circuitry of the image sensor integrated circuit 1030 (e.g., row circuitry 1035 or column circuitry 1034). In one embodiment, exposure controller 430 can generate a first exposure stop signal for pixels in the first region 420 and a second exposure stop signal for pixels in the second region.

Operations of the indicia reading terminal 1000 will, according to one embodiment of a method of operation will now be described. In one embodiment, a process can begin when a trigger is actuated for inputting image data to the indicia reading terminal 1000.

Figure 5:
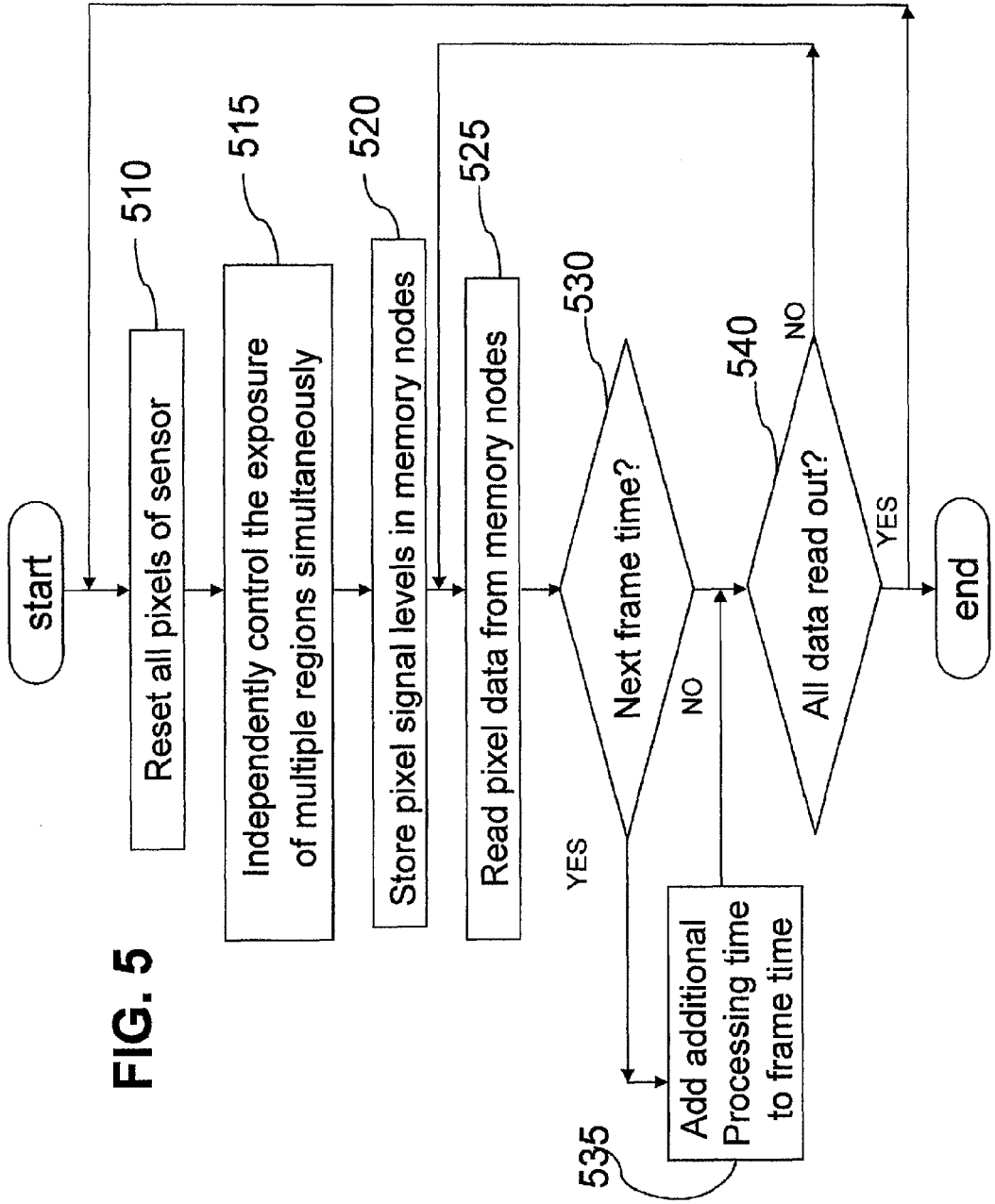
FIG. 5 is a flowchart illustrating an embodiment of a method for operating an image sensor having dual exposure periods.

As shown in FIG. 5, in operation, after a process starts, the indicia reading terminal 1000 can clear pre-existing charge from the photodiodes for all pixels and corresponding storage nodes in an array forming the image sensor 400 (block 510). Then, different simultaneous exposure periods for at least two different regions of the image sensor 400 are independently controlled (block 515). In one embodiment, the different exposure periods correspond to first and second regions 420, 425 receiving imaging light via first and second different lens systems. Pixel signal levels (e.g., voltages) for the first and second regions 420, 425 of the image sensor 400 can be stored in corresponding memory nodes in the array forming the image sensor 400 (block 520). In one embodiment, the photodiodes signals are simultaneously stored (e.g., read globally) across the sensor array. The stored pixel values are then output from the image sensor 400 (block 525) (e.g., during the next data readout time or corresponding frame time). When a frame time is exceeded (block 530), additional processing time (e.g., a blanking time) can be added to increase a data readout time or extend the frame time (block 535) to ensure that all data is read out during the current frame time (block 540). Operations in blocks 525-540 can be repeated until all data is output. Optionally, after the data is read out (block 540, YES), a process can end or can be repeated for a subsequent exposure (e.g., image frame) of the image sensor 400 (jump to block 510).

Figure 6A:
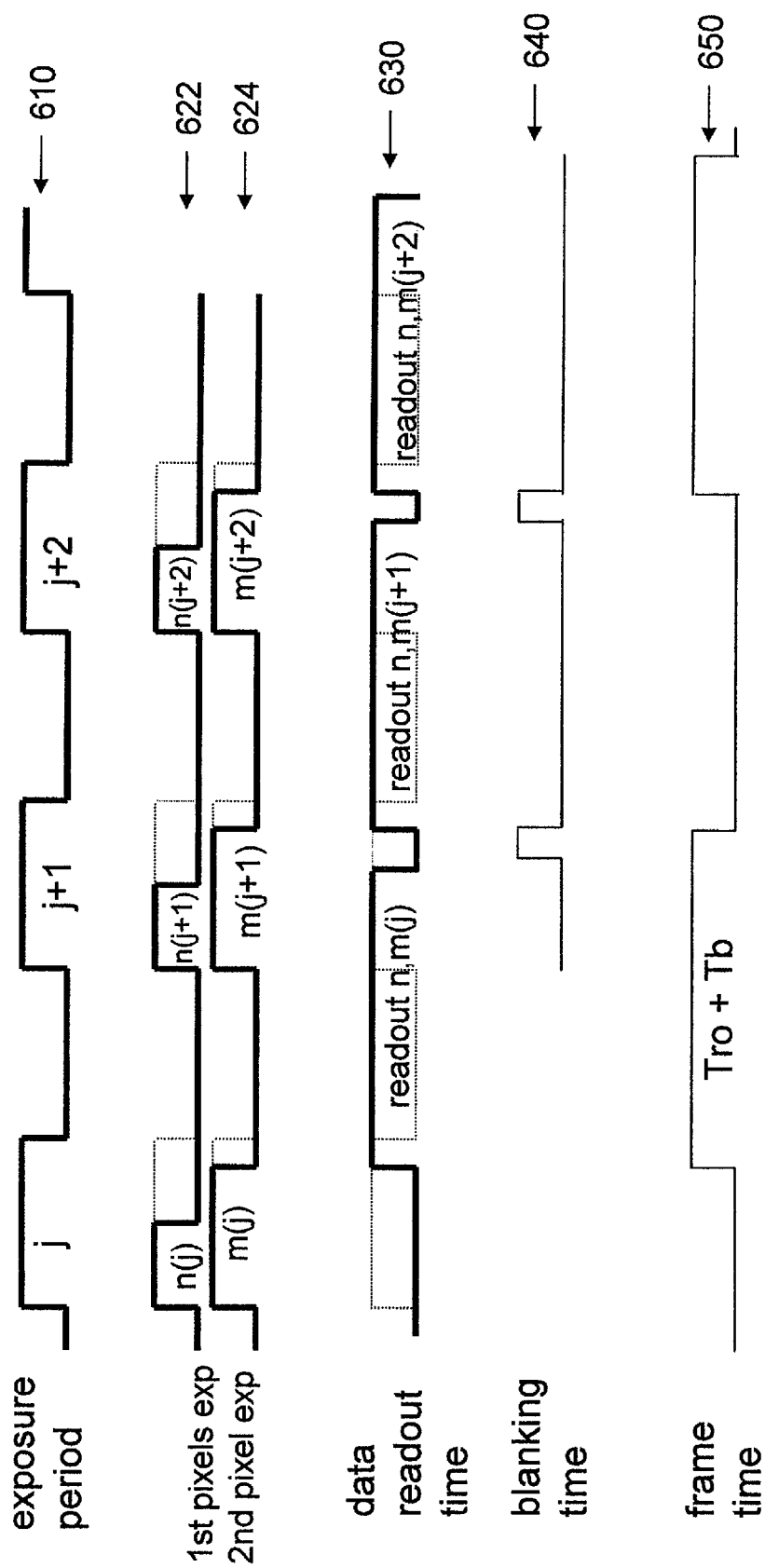
FIGS. 6A-6C are diagrams that illustrate exemplary timing for operations of an image sensor according to the application.
Figure 6B:
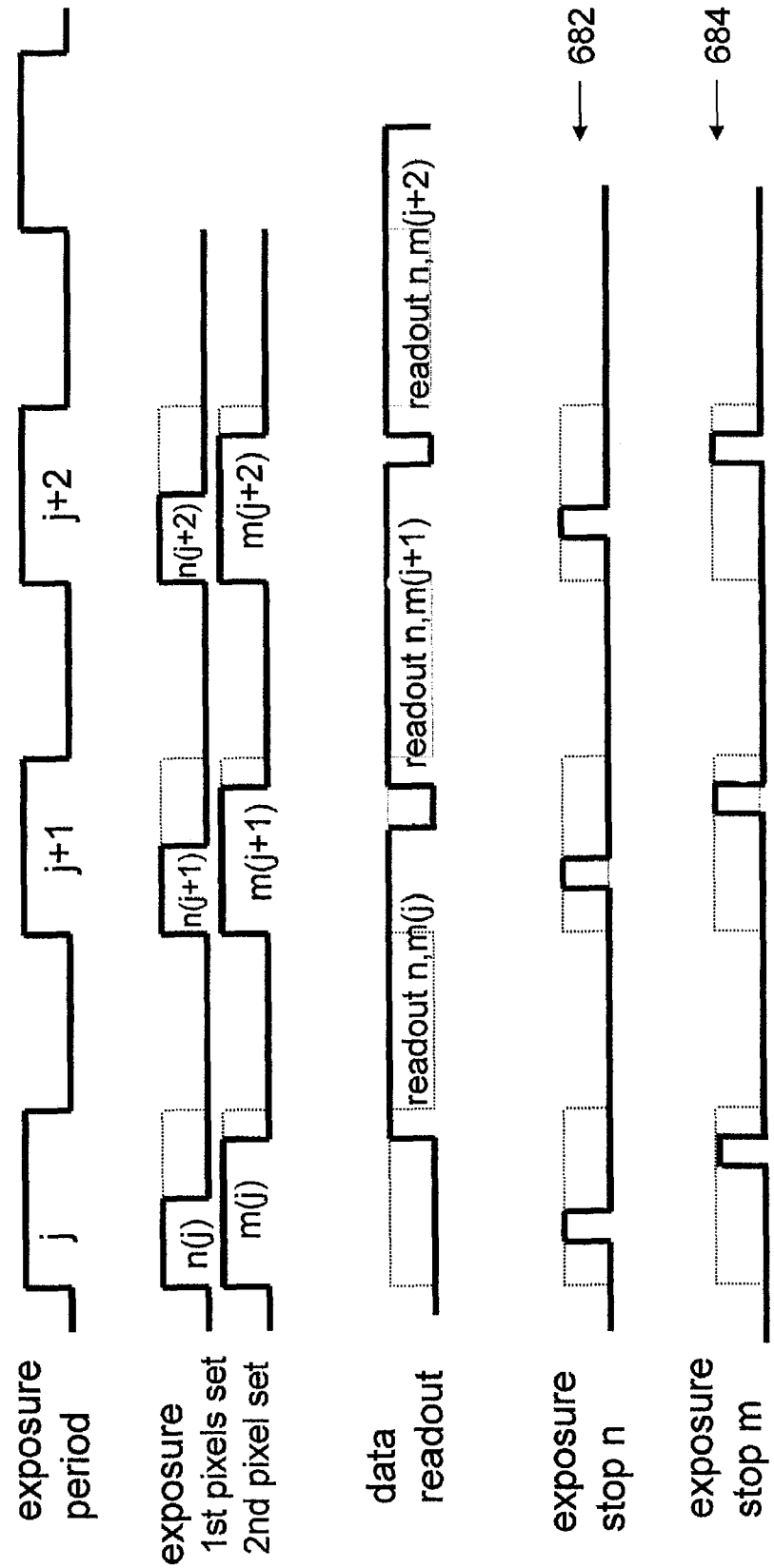

A representative timing diagram is illustrated in FIG. 6A. As shown in FIG. 6A, the image sensor 400 can be exposed periodically (e.g., j, j+1, j+2, . . . ) in a sequence of exposure periods 610. In one embodiment, the exposure period 610 is an interval where imaging light is passed via the first and second lens systems to the image sensor 400. Alternatively, the exposure period can be a prescribed or variable time interval controlled by the indicia reading terminal 1000 (e.g., electronically or mechanically) that can be less than or much less than the interval when imaging light is passing through the lens systems.

As shown in FIG. 6A, in a current exposure period or first exposure period (j), pixels in first region 420 have a corresponding first exposure period 622 and the second region 425 have a second different corresponding exposure period 624. Pixel data n and pixel data m can be output from the image sensor 400 (e.g., memory nodes) during data readout periods 630. A data readout period 630 can begin upon the termination of the longer exposure period 622, 624. For example, as shown in FIG. 6A, the data readout period can begin upon the termination of the second exposure period 624, which is longer than the first exposure period 622 in FIG. 6A.

A blanking time Tb can be added to the data readout time Tro to form a frame time Tf. For example, a blanking time can be used to accommodate a slower processing speed in a host processor (e.g., controller 1060, image sensor IC 1040). In one embodiment, Tf=Tro+Tb, when Texp<Tro+Tb, where Texp can be a time for the exposure period 610. Thus, embodiments according to the application can provide different exposure periods for different regions of a single image sensor array within one exposure period for the image sensor array.

The image sensor 400 can output data from a previous exposure period 610 (e.g., j) concurrently with obtaining image data in a later or subsequent exposure period 610 (e.g., j+1). As shown in FIG. 6A, exposure periods n (j+2), m (j+2) for pixels in first region 420 and the second region 425 can overlap a data readout time 630 (readout n(j+1), m(j+1)) for a previous exposure of pixels in the first region 420 and the second region 425. Thus, an exposure process and a data readout process can be performed in parallel by the image sensor 400 in the indicia reading terminal 1000. The blanking period Tb can be extended to reach the initiation of a next exposure period 622, 624 when a data readout time 630 takes longer than the exposure time 622, 624. Thus, in one embodiment, Tf=Tro+Tb+(Texp−Tro−Tb) when Texp>Tro+Tb.

In one embodiment, the exposure period 622, 624 can be controlled using a first exposure termination signal 682 for pixels in the first region 420 and a second exposure termination signal 684 for pixels in the second region 425. In one embodiment, differing gain register settings for the two defined regions 420, 425 can be used to determine the first and second exposure terminating signals 682, 684 in the image sensor 400.

Figure 6C:
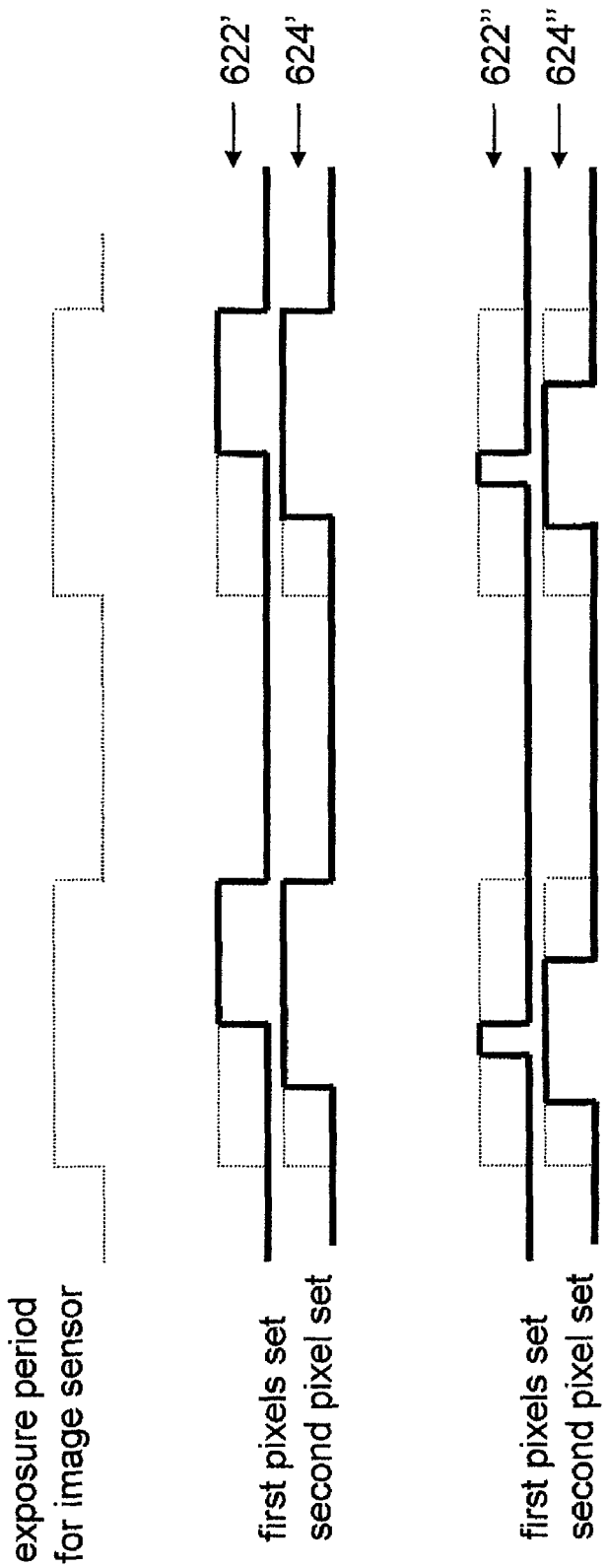

As shown in FIG. 6A, exposure periods 622, 624 have a corresponding exposure period initiation. However, embodiments according to this application are not intended to be so limited. For example, exposure periods 622", 624" for the first region 420 and the second region 425 can overlap as shown in FIG. 6C. Alternatively, exposure periods 622', 624' can have a corresponding exposure period termination. In one embodiment, a first exposure time and a second exposure time maintain a substantially constant brightness or a substantially balanced brightness for pixels in the first set of pixels and the second set of pixels, respectively.

Figure 7A:
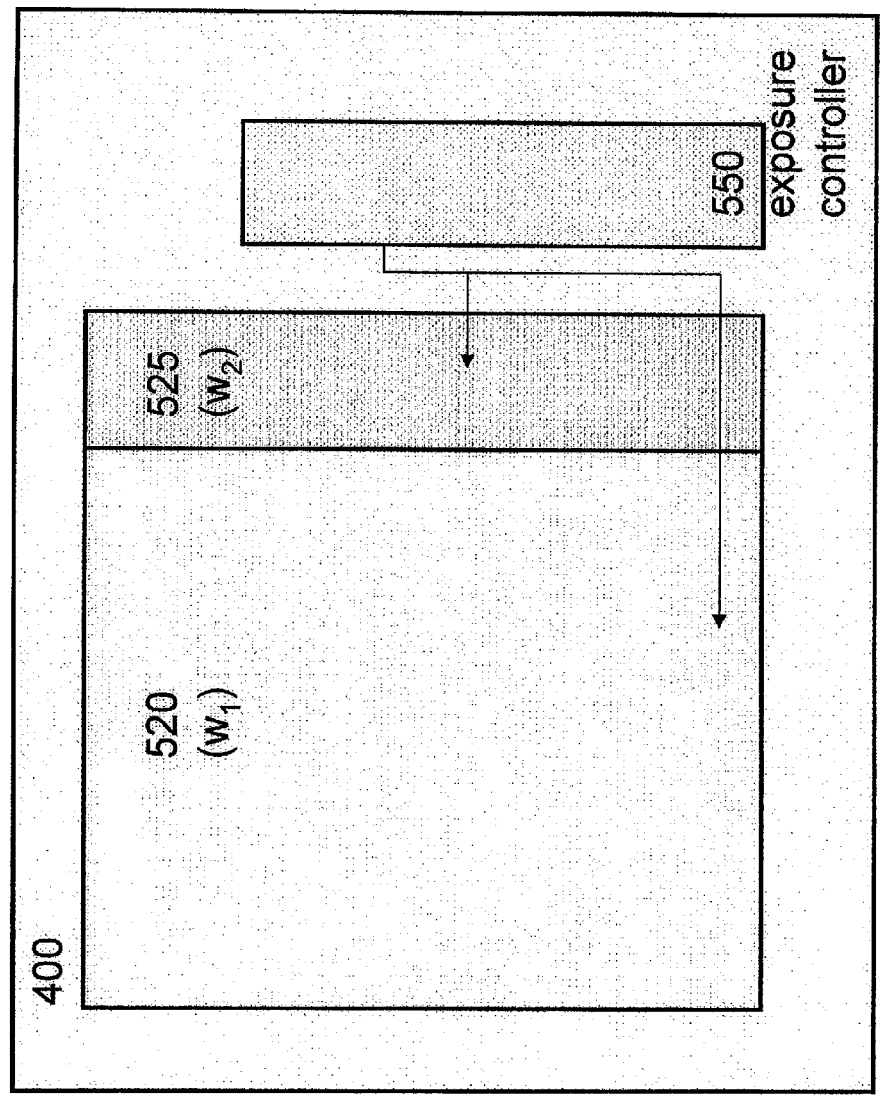
FIGS. 7A-7D are diagrams that illustrate exemplary embodiments of an image sensor according to the application.
Figure 7B:
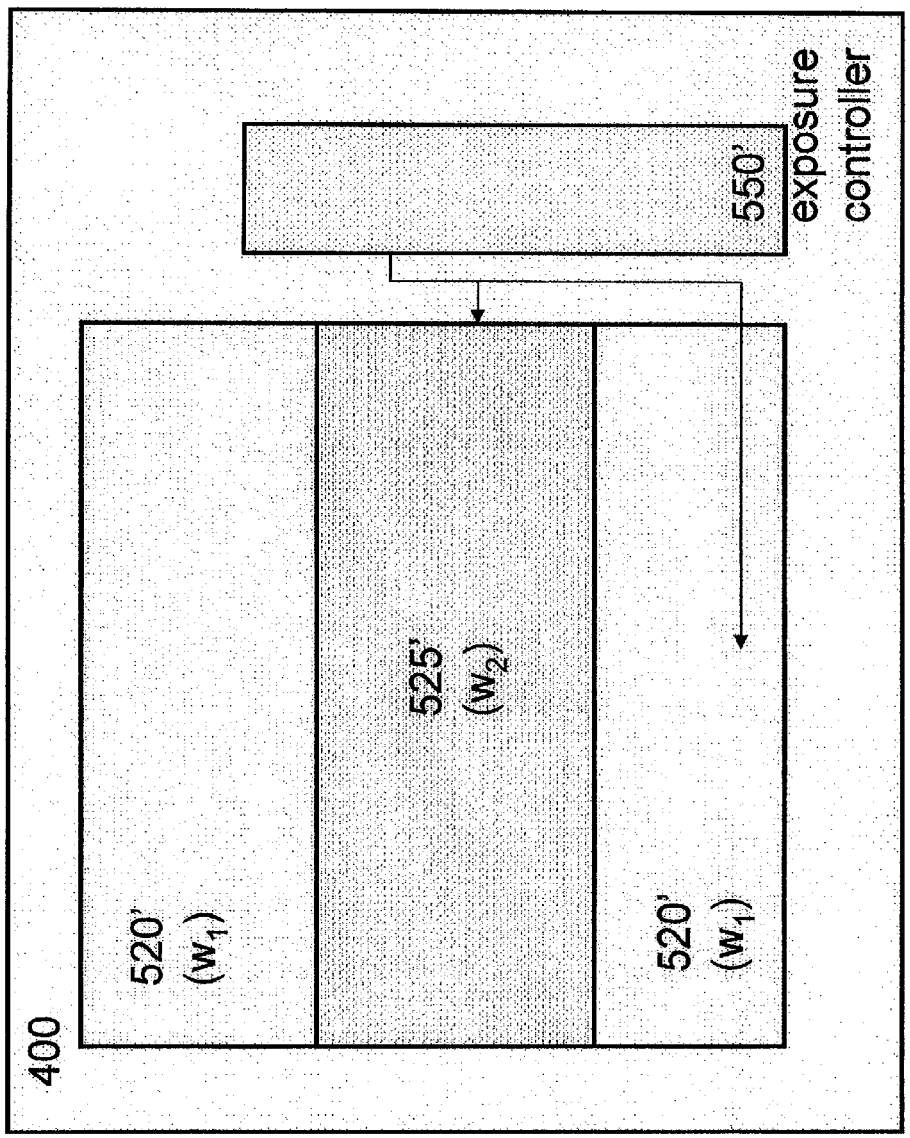
Figure 7C:
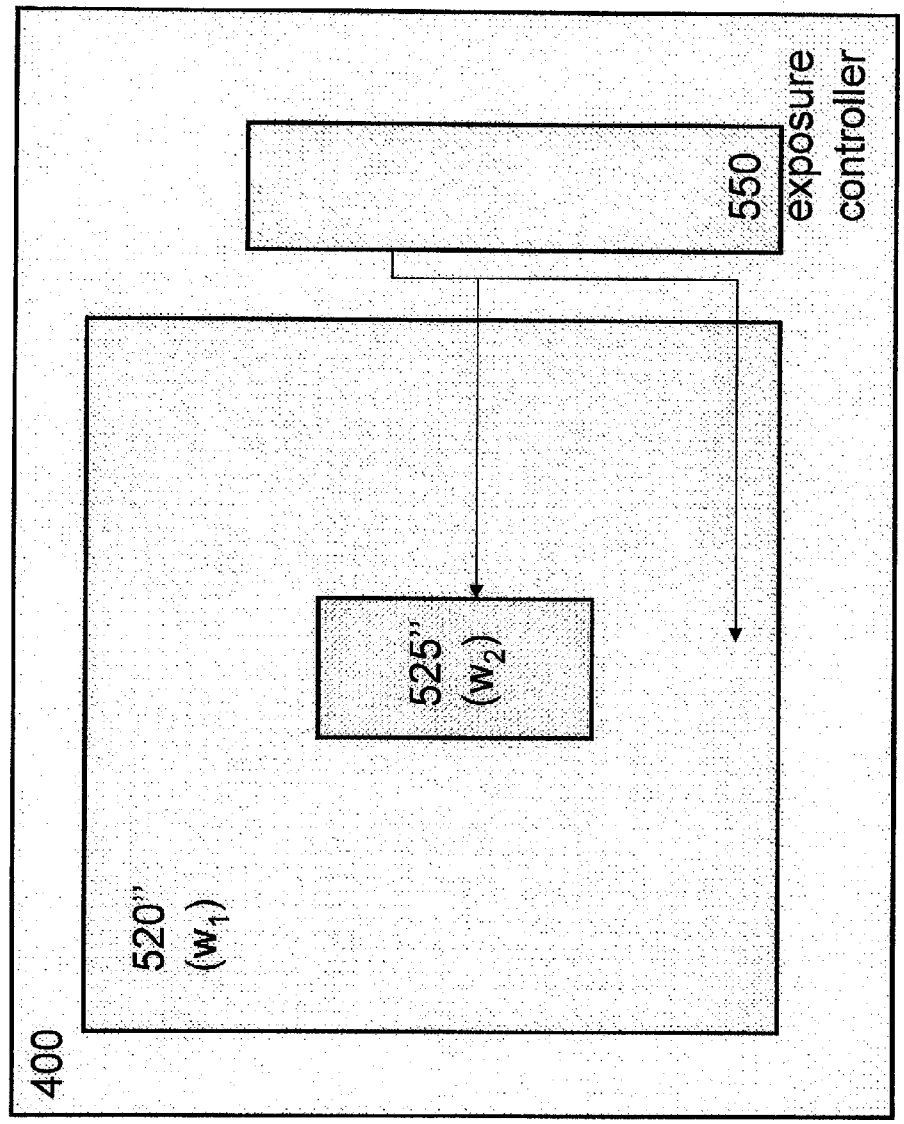

FIGS. 7A-7C are diagrams that illustrate alternative embodiments for first and second regions in the image sensor 400 that can have different exposure periods or gain settings. As shown in FIG. 7A, first region 520 and second region 525 are contiguous and comprise all pixels in the array forming the image sensor 400. However, the second region 525 can include pixels from a subset of columns of the image sensor 400.

Figure 7D:
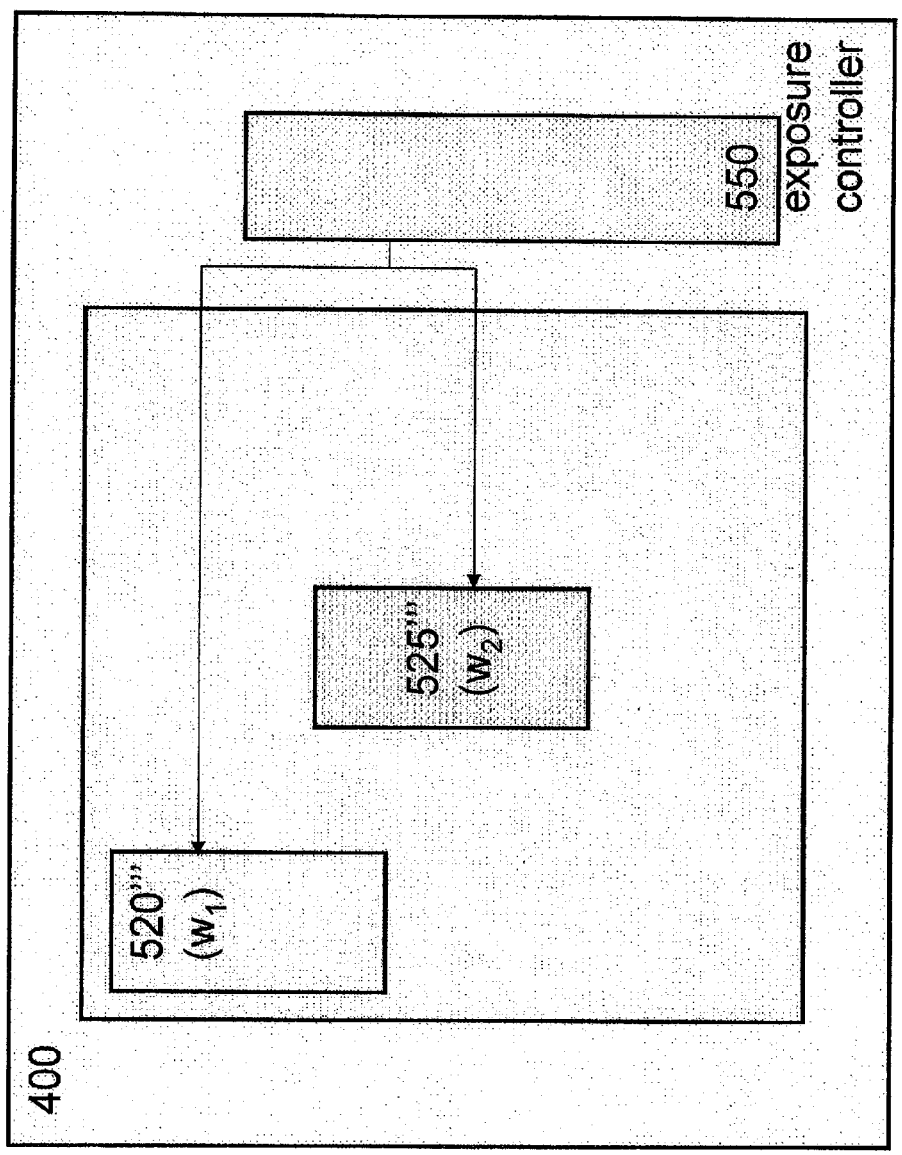

As shown in FIG. 7B, first region 520' and second region 525' are contiguous and comprise all pixels in the array forming the image sensor 400; however, the second region 525' can include a set of rows from the middle of the image sensor 400. As shown in FIG. 7C, first region 520" and second region 525" are contiguous and comprise all pixels in the array forming the image sensor 400; however, the second region 525" can include a middle subset of pixels from a plurality of rows and/or columns not along an edge of the image sensor 400. As shown in FIG. 7D, first region 520'" and second region 525'" are contiguous but do not comprise all pixels in the array forming the image sensor 400.

Referring to further aspects of terminal 1000, first optical assembly 10 can have a first best focus distance and second optical assembly 20 have a second best focus distance that is different from the first best focus distance. Configuring assemblies 10 and 20 to have different best focus distances can increase a working range of terminal 1000. For example, in one embodiment optical assembly 10 can be configured to have a short range best focus distance of about 100 mm and second optical assembly 20 can be configured to have a long range best focus distance of greater than 400 mm. In one embodiment, a target substrate having decodable indicia that is too far away to be adequately focused by first optical assembly 10 may nevertheless be successfully focused by second optical assembly 20. Further, at longer reading distances, a narrow field of view can prevent there from being represented in a frame captured for decoding processing extraneous decodable indicia (e.g., on a shipping box other than the one of interest) that the user has no interest in decoding, and if subject to processing can unnecessarily consume processing time. Also, the narrow field of view at a long range focus distance can provide for capture of high resolution (in terms of pixels per unit length) frames for processing.

In one embodiment, terminal 1000 can be configured so that terminal 1000 is optimized for decoding 2D bar code symbols utilizing image data corresponding to a first set of pixels 41 representing light transmitted through first optical assembly 10 and incident on first set of pixels 41 and/or be further configured (e.g., optimized) for decoding 1D symbols utilizing image data corresponding to second set of pixels 42 and representing light transmitted through second optical assembly 20 and incident on second set of pixels 42. 1D bar code symbols include UPC, Code 39 and Code 128. 2D bar code symbols include Datamatrix, QR Code, Aztec, and PDF 417. Terminal 1000 can be adapted so that a level of optimization for decoding 2D bar code symbols is higher when terminal 1000 processes image data representing light incident on first set of pixels 41 relative to image data representing light incident on second set of pixels 42. Display 1304 or multiple displays can provide corresponding results to a user.

Figure 8:
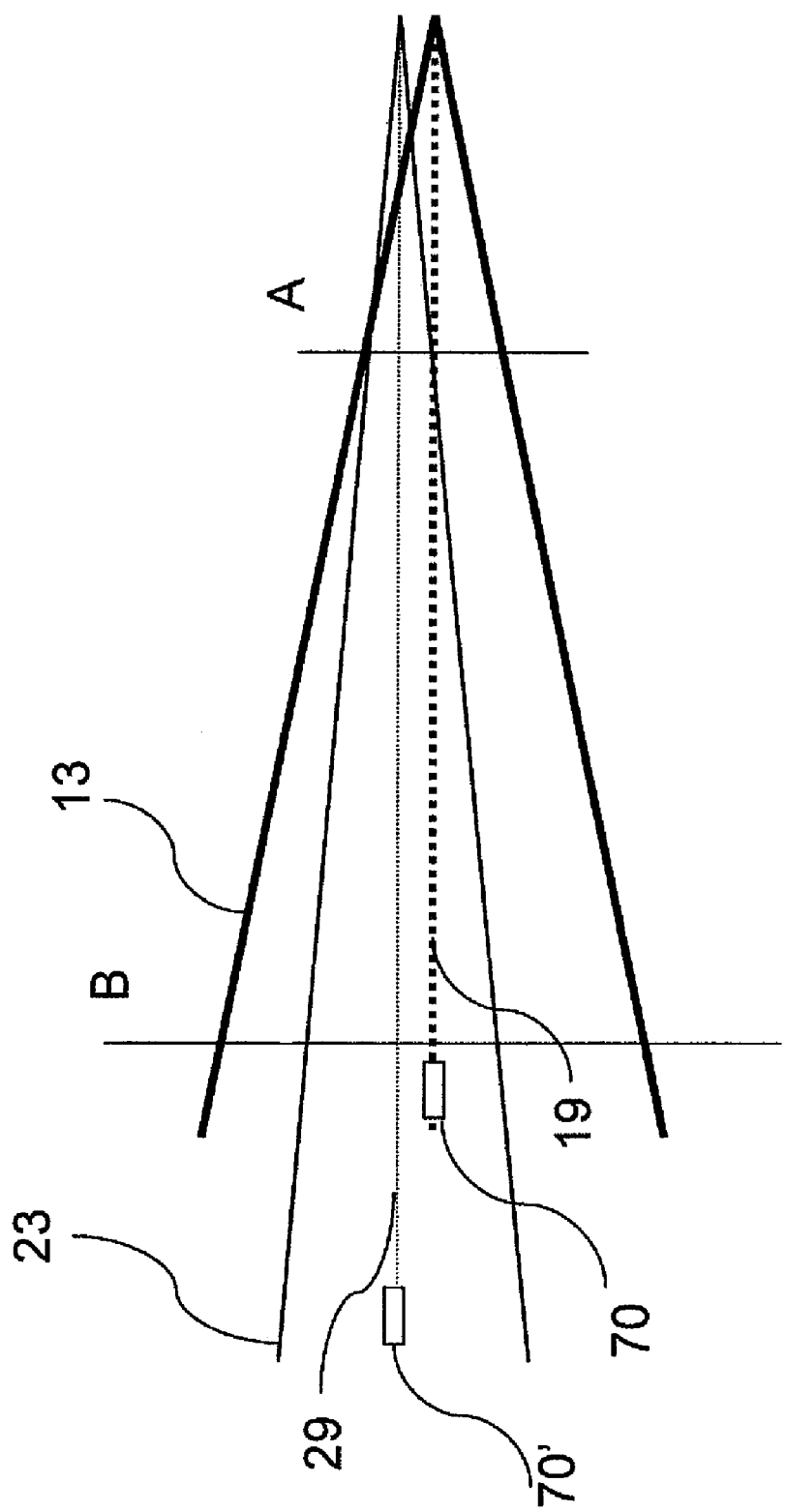
FIG. 8 is a side view illustrating relationships between aiming patterns associated with first and second optical assemblies in one embodiment.

Referring to further aspects of imaging module 600, imaging module 600 can be adapted so that light from aiming pattern light source bank 618 is projected at a specific location with respect to a target 50 on which fields of view 13 and 23 can be defined. FIG. 8 illustrates respective fields of view 13 and 23 defined by first optical assembly 10 and second optical assembly 20, respectively, at various terminal to target distances ranging from a short range distance A to a long range distance B. A short range distance can be 50 mm, 100 mm, 150 mm or an exemplary range such as 80-120 mm. A long range distance can be 300 mm, 400 mm, 500 mm or an exemplary range such as 360-440 mm. As seen from FIG. 8, the field of view 13 defined by first optical assembly 10 in combination with image sensor array 1033, at a given terminal to target distance, is relatively larger than field of view 23 defined by second optical assembly 20 in combination with image sensor array 1033.

In one embodiment, terminal 1000 can include a single aiming pattern generator that projects aiming pattern 70. In yet another embodiment, terminal 1000 can include first and second aiming pattern generators for projecting each of an aiming pattern 70 substantially at horizontally extending centerline 19 through a range of terminal to target distances and aiming pattern 70' substantially at horizontally extending centerline 29 through a range of terminal to target distances. Terminal 1000 in one embodiment can include a first aiming pattern generator comprising elements 618 and 619 and a second aiming pattern generator comprising elements 620 and 621. Terminal 1000 can be operative so that the two spaced apart patterns 70, 70' can be projected simultaneously as shown in FIG. 8. Alternatively, terminal 1000 can be operative so that the two patterns are projected in the alternative in a manner responsive to a sensed condition. Terminal 1000 can be operative to sense a terminal to target distance by reading a white level of a frame of image data, with a higher average white level indicating more artificial illumination from terminal 1000 and therefore a closer terminal to target distance. Further, multiple triggers can be respectively used for selecting one of the first set of pixels or the second set of pixels.

Customers may use or set a default selection (the first optical assembly or the second optical assembly) or the default selection can be the previously used value.

Although embodiments were described with a dual lens system and two regions of an image sensor having independent exposure times, this application is not intended to be so limited. For example, three or more regions of the image sensor array can be configured to have independent exposure times. Alternatively, three or more lens systems can be used or one lens system can be modified to expose two or more regions of an image sensor.

Embodiments according to the application have been described as operating in parallel during multiple subsequent image processes (e.g., exposure periods). However, embodiments according to the application are not intended to be so limited. For example, data readout operations can be performed sequentially after different first exposure periods $w_1$ and second exposure periods $w_2$ occur in a single exposure period.

Embodiments according to the application (e.g., exposure controller) have been described as operating on individual pixels in an image sensor. However, embodiments according to the application are not intended to be so limited. For example, embodiments such as an exposure controller can be configured to control two or more pixels (e.g., adjacent pixels) using a single control line or single exposure control signal for a first exposure period $w_1$ or a second exposure period $w_2$.

Embodiments of the application provide an indicia reading terminal that can be low cost, reliable, and durable. In one embodiment, a dual lens system for barcode reading and image capture can be respectively used for each of a small reading range of an image reading terminal and a large reading range of the image reading terminal.

A small sample of systems methods and apparatus that are described herein is as follows:

An image reading terminal including a two dimensional image sensor array extending along an image plane, the two dimensional image sensor array including a plurality of pixels; a hand held housing encapsulating the two dimensional image sensor array; a first optical assembly for focusing imaging light rays onto a first set of pixels of the two dimensional image sensor array, wherein the first set of pixels have a first exposure time for receiving the imaging light rays transmitted by the first optical assembly; a second optical assembly for focusing imaging light rays onto a second set of pixels of the two dimensional image sensor array, wherein the second set of pixels have a second different exposure time for receiving the imaging light rays transmitted by the second optical assembly; the first exposure time and the second exposure times are in a single exposure period for the image sensor array; a memory capable of storing a frame of image data, the frame of image data representing light incident on the image sensor array; and a CPU capable of addressing the memory, wherein the CPU is adapted to attempt to decode a decodable indicia represented in the frame of image data.

An indicia reading terminal including an image sensor array including a plurality of pixels; a hand held housing encapsulating the image sensor array; an image sensor array control circuit to control a first exposure time for a first set of pixels of the plurality of pixels and a second different exposure time for a second different set of pixels of the plurality of pixels in a frame time of the image sensor array; an image sensor array readout control circuit to output image data of the first set of pixels and second set of pixels from the frame time; a memory capable of storing the image data; and a CPU capable of addressing the memory, wherein the CPU is adapted to attempt to decode a decodable indicia represented in the image data.

An image reading terminal including a two dimensional image sensor array extending along an image plane, the two dimensional image sensor array including a plurality of pixels; an image sensor array control circuit to read out a frame of data from the plurality of pixels; a first set of pixels and a second different set of pixels comprise the plurality of pixels of the image sensor array, wherein the first set of pixels and the second set of pixels each have different exposure times; and a CPU capable of receiving the frame of data, wherein the CPU is adapted to attempt to decode a decodable indicia represented in the frame of data.

While the present application has been described with reference to a number of specific embodiments, it will be understood that the true spirit and scope of the application should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment.

We claim:

1. An image reading terminal comprising:
    a two dimensional image sensor array extending along an image plane, said two dimensional image sensor array comprising a plurality of pixels;
    a hand held housing encapsulating said two dimensional image sensor array;
    a first optical assembly for focusing imaging light rays onto a first set of pixels of said two dimensional image sensor array, wherein the first set of pixels comprise pixels of a plurality of rows of pixels of the two dimensional image sensor array, wherein said first set of pixels have a first exposure time for receiving said imaging light rays transmitted by said first optical assembly;
    a second optical assembly for focusing imaging light rays onto a second set of pixels of said two dimensional image sensor array, wherein the second set of pixels comprises pixels of a plurality of rows of pixels of the two dimension image sensor array wherein said second set of pixels have a second different exposure time of a duration different from a duration of the first exposure time for receiving said imaging light rays transmitted by said second optical assembly;
    wherein a portion of said first exposure time and a portion of said second exposure time are concurrent;
    a memory capable of storing a frame of image data, said frame of image data representing light incident on said image sensor array; and
    a CPU capable of addressing said memory, wherein said CPU is adapted to attempt to decode a decodable indicia represented in said frame of image data.

2. The image reading terminal of claim 1, wherein said first exposure time and said second exposure time have a concurrent start time or overlap within a single exposure period for the image sensor array.

3. The image reading terminal of claim 1, wherein said first exposure time and said second exposure time represent independent exposure or gain settings for the first set of pixels and the second set of pixels, respectively.

4. The image reading terminal of claim 1, wherein said first exposure time and said second exposure time maintain a substantially constant brightness or a substantially balanced brightness for pixels in the first set of pixels and the second set of pixels, respectively.

5. The image reading terminal of claim 1, wherein the first set of pixels is larger than the second set of pixels, wherein the first set of pixels is larger than 90%, larger than 70% or larger than 50% of the image sensor array, wherein the first set of pixels are respectively contiguous in the image sensor array, and wherein the second set of pixels are respectively contiguous in the image sensor array.

6. The image reading terminal of claim 1, wherein the first set of pixels and the second set of pixels comprise 100%, less than 50%, less than 25%, less than 5% or less than 0.5% of pixels in the image sensor array.

7. The image reading terminal of claim 1, comprising an image sensor array control circuit configured set said first exposure time and said second different exposure time within a frame time of a frame rate of the image reading terminal.

8. The image reading terminal of claim 7, wherein a blanking time is added to the frame time when one of said first exposure time or said second different exposure time exceed the frame time.

9. The image reading terminal of claim 8, wherein said frame rate of the image reading terminal decreases as a vertical blanking time increases.

10. The image reading terminal of claim 1, said first optical assembly to include a center optical axis and a first imaging lens, said second optical assembly to include a center optical axis and a second imaging lens, wherein said first imaging lens of said first optical assembly has a shorter focal length than the second imaging lens of said second optical assembly.

11. The image reading terminal of claim 1, wherein the first set of pixels and the second set of pixels comprise a plurality of rows, a plurality of columns, a single row, a single column, a partial row or a partial column in the image sensor array.

12. The image reading terminal of claim 1, wherein said first optical assembly and said image sensor array define a first field of view, and wherein said second optical assembly and said image sensor array define a second field of view, and wherein said terminal includes a first aiming pattern generator and a second aiming pattern generator, the first aiming pattern generator capable of projecting an aiming pattern at a prescribed location for said first field of view through a range of terminal to target distances, the second aiming pattern generator capable of projecting an aiming pattern at a prescribed location in said second field of view through a range of terminal to target distances.

13. The image reading terminal of claim 1, wherein the image sensor array comprised a Bayer pattern or a monocolor sensor.

14. An indicia reading terminal comprising:
    a two dimensional image sensor array comprising a plurality of pixels;
    a hand held housing encapsulating said two dimensional image sensor array;
    an image sensor array control circuit to control a first exposure time for a first set of pixels of the plurality of pixels and a second different exposure time for a second different set of pixels of the plurality of pixels of the image sensor array, the first exposure time and the second exposure time having different durations, wherein the first set of pixels comprise pixels of a plurality of rows of pixels of the two dimensional image sensor array, wherein the second set of pixels comprise pixels of a plurality of rows of pixels of the two dimensional image sensor array, wherein a portion of the first exposure time and a portion of the second different exposure time are concurrent, wherein;

an image sensor array readout control circuit to output image data of the first set of pixels and the second set of pixels;

a memory capable of storing said image data; and a CPU capable of addressing said memory, wherein said CPU is adapted to attempt to decode a decodable indicia represented in said image data.

15. The indicia reading terminal of claim 14, wherein the image data is a frame of image data representing light incident on the plurality of pixels of said image sensor array, wherein the first exposure time and said second exposure time overlap or concurrently start in a frame time.

16. The indicia reading terminal of claim 14, wherein said first exposure time and said second exposure time represent independent exposure or gain settings for the first set of pixels and the second set of pixels, respectively.

17. The indicia reading terminal of claim 14, wherein said first exposure time and said second exposure time maintain a substantially constant brightness or a substantially balanced brightness for pixels in the first set of pixels and the second set of pixels, respectively.

18. The indicia reading terminal of claim 14, comprising:

a first optical assembly to focus imaging light rays onto a first set of pixels of said two dimensional image sensor array; and a second optical assembly to focus imaging light rays onto a second set of pixels of said two dimensional image sensor array, wherein the first set of pixels and the second set of pixels are respectively contiguous in the image sensor array.

19. An image reading terminal comprising:

a two dimensional image sensor array extending along an image plane, said two dimensional image sensor array comprising a plurality of pixels;

an image sensor array control circuit to read out a frame of data from said plurality of pixels;

a first set of pixels and a second different set of pixels comprise the plurality of pixels of the image sensor array, wherein the first set of pixels and the second set of pixels each have different exposure times, the different exposure times being different durations, wherein the first set of pixels comprise pixels of a plurality of rows of pixels of the two dimensional image sensor array, wherein the second set of pixels comprises pixels of a plurality of rows of pixels of the two dimension image sensor array, wherein a portion of the different exposure times are concurrent; and a CPU capable of receiving the frame of data, wherein said CPU is adapted to attempt to decode a decodable indicia represented in said frame of data.

20. The image reading terminal of claim 19, wherein the frame of data represents light incident on the plurality of pixels of said image sensor array.

* * * * *